US008527505B2

(12) United States Patent
Mumford

(10) Patent No.: US 8,527,505 B2
(45) Date of Patent: Sep. 3, 2013

(54) MULTIPLATFORM COMMUNICATION AND MEDIA JOURNAL WITH MAPPING

(75) Inventor: Gregory L. Mumford, Marion, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 551 days.

(21) Appl. No.: 12/333,919

(22) Filed: Dec. 12, 2008

(65) Prior Publication Data
US 2010/0153433 A1    Jun. 17, 2010

(51) Int. Cl.
*G06F 7/00*    (2006.01)

(52) U.S. Cl.
USPC ........... 707/722; 707/736; 707/741; 707/769; 707/771; 707/913

(58) Field of Classification Search
None
See application file for complete search history.

(56) References Cited

U.S. PATENT DOCUMENTS

| | | | |
|---|---|---|---|
| 2003/0069893 A1* | 4/2003 | Kanai et al. | 707/104.1 |
| 2007/0213004 A1* | 9/2007 | DaCosta | 455/3.06 |
| 2007/0245238 A1* | 10/2007 | Fugitt et al. | 715/700 |
| 2008/0133697 A1* | 6/2008 | Stewart et al. | 709/217 |
| 2008/0294663 A1* | 11/2008 | Heinley et al. | 707/100 |
| 2009/0204899 A1* | 8/2009 | Bennett | 715/730 |

* cited by examiner

*Primary Examiner* — Anh Tai Tran

(57) ABSTRACT

A plurality of media files may be maintained in a data store, where each of the plurality of media files is associated with at least one indication comprising at least one of a geographic indication and a time indication. At least one indication may be identified, wherein the at least one indication is one of a geographic indication and a time indication. A query may be sent to the data store, wherein the query includes the identified at least one indication and at least one media file may be retrieved from the data store according to the query.

28 Claims, 8 Drawing Sheets

MULTIPLATFORM COMMUNICATION AND MEDIA JOURNAL WITH MAPPING

BACKGROUND

Some journals are an account of day-to-day events. Others are a record of experiences, ideas, or reflections. Some journals are kept regularly for private use. Still others are public, such as periodicals, and deal especially with matters of current public or personal interest.

Blogging, the keeping of an online web log (blog), may be as popular today as keeping a journal or diary has been popular for many years. Blogging, however, may be more public than a traditional journal may have been in the past. As a result, it may share some aspects of producing a publication, such as a periodical, for public consumption. Accordingly, there is a need to continually provide new material that is readily accessible, efficiently presented and content rich to keep a blog fresh and to both maintain and even increase readership.

DETAILED DESCRIPTION

Figure 1:
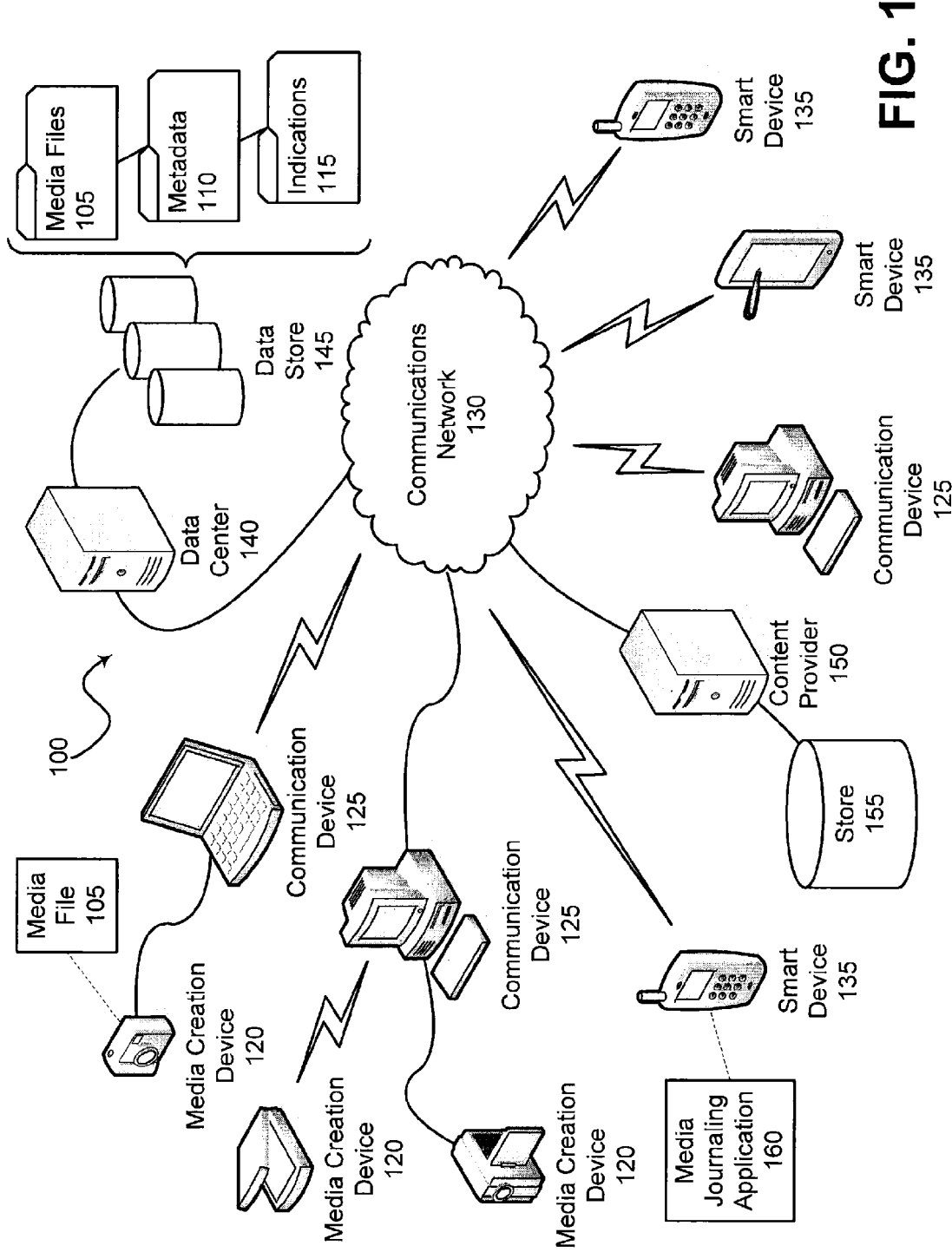
FIG. 1 illustrates an exemplary communications system for the generation and access of a media journal such as a blog.

FIG. 1 illustrates an exemplary communications system (system) 100 for the generation and access of a media journal such as a blog.

A subscriber may be a user of a communications system, such as system 100. A subscriber may routinely or erratically update a journal including various media files, and in so doing may create and maintain the media journal. The media journal may include the activities of the subscriber. Multimedia files and descriptive text may be included in entries for the media journal. A media journal view may be displayed for the media journal, wherein the media journal view may be displayed as a blog, as a map, as a timeline, or in some other format.

As illustrated in FIG. 1, in an exemplary approach system 100 includes at least one media file 105. A media file 105 is a file that may include audio, video, and textual content. The system 100 may further include a media creation device 120. A media creation device 120 may include for example, a camera, a scanner, a video recorder, an audio recorder, and a text recorder, and may be used to create media files 105. In some examples the media creation device 120 may be used by a subscriber in order to create media files 105. In other examples, the media creation device 120 may automatically create media files 105, such as on a timer, and through logging subscriber use of a device. In still further examples, the media files 105 may be created by another subscriber through use of the subscriber's media creation device 120.

In addition to the creation of media files 105, the media creation device 120 may embed or otherwise associate additional information, or metadata 110, into a media file 105.

The metadata 110 may include information identifying the media creation device 120 itself, such as a unique identifier of the device, and may include settings or features used by the media creation device 120 in the creation and format of the media file 105. For example, for a digital photograph, exemplary metadata 110 may include F-stop, image resolution, image bit-depth, the compression algorithm used to store the image, and the like.

Additionally, the metadata 110 may include indications 115, where the indications 115 may for example indicate the circumstances surrounding the creation of the media files 105, but unrelated to the aspects of creation and format of the media file 105. For example, a geographic indication 115 relating to a location of the media creation device 120 at the time the media file 105 is created may be included as an item of metadata 110. The geographic indication 115 may be represented in various ways, including but not limited to an address, a zip code, a telephone area code, one or more sets of latitude and latitude coordinates, and so on. As another example, a time indication 115 relating to a time and date of creation of the media file 105 may be included as an item of metadata 110. The time indication 115 may also be represented in various ways, including but not limited to a data and time, a time of day, a start time and an end time, an identifier of an event occurring at a known time, and so on. As a further example, an indication 115 may further indicate a label of a trip, a label of a vacation, a type of media file 105, a type of content, a subscriber, a membership in a social group, and so on, and may be included as an item of metadata 110. These, as well as other items of metadata 110, may be embedded or otherwise associated with the media file 105.

The media creation device 120 may determine a geographic indication 115 in a variety of ways. For example, the media creation device 120 may include or be connected to a Global Positioning System (GPS) device, where the GPS device may be used to determine the location of the media creation device 120.

A GPS device may receive precise microwave signals, such as those transmitted from the Global Navigation Satellite System (GNSS) of medium Earth orbit satellites. The GPS device may use the received signals to determine a current location, time, and velocity of the GPS device. The GPS device may determine a global position on the Earth in two or three dimensions, and may perform with variable accuracy, typically within up to about three feet. The GPS device may be used to determine the location coordinates of the media creation device 120, and the media creation device 120 may receive these coordinates from the GPS device. The media creation device 120 may query the GPS device for location coordinates at or near the time of media file 105 creation, and may embed the location coordinates into the media file 105 when the media file 105 is saved.

In some examples, a GPS device may be included within the media creation device 120, while in other examples a GPS device may otherwise be accessible from the media creation device 120 through an interface.

The media creation device 120 may determine a location through other means as well. For example, a media creation device 120 may include network connectivity, and may determine a geographic indication 115 based on a network device to which the media creation device 120 is or was connected. In further examples, an address of the media creation device 120 or a manually-entered value may be used as a geographic indication 115.

The media creation device 120 may determine a time indication 115 in a variety of ways as well. The media creation device 120 may include or be in communication with a device that may determine a current time (including but not limited to a GPS device, a clock circuit including a clock oscillator, a communications device configured to retrieve the time based on Internet Network Time Protocol, a radio receiver of a radio reference signal such as the WWV radio station in the continental United States, and so on). The media creation device 120 may request and/or receive a time indication 115, and may embed or otherwise associate the time indication 115 with a media file 105 created by the media creation device 120. In some examples, the media creation device 120 may request a time indication 115 at or near the time of media file 105 creation, and may embed into or otherwise associate the time indication 115 with the media file 105 when the media file 105 is captured or saved.

The system 100 may further include a communications device 125. A communications device 125 (including, but not limited to Plain Old Telephone Service (POTS) telephone, Voice Over Internet Protocol (VOIP) telephone, mobile telephone, "softphone," pager, computer, Set Top Box (STB), etc.) is used by a subscriber to send and receive communications (e.g., voice, text, image, video, binary data, etc.) on a communications network 130 (e.g., Public Switched Telephone Network (PSTN), Verizon Wireless's cellular telephone network, the Internet, etc.). Likewise, a communications network 130 may provide communications services, including voice calling, packet-switched network services (such as Internet access and/or VOIP communication services, Short Message Service (SMS) messaging. Multimedia Messaging Service (MMS) messaging services, and so on), to at least one communications device 125. A communications network 130 may further provide secure data storage and retrieval services to at least one communications device 125.

A communications device 125 may include various communications features. For example, the communications device 125 may provide audio communications (such as the ability to send and receive telephone calls and to record and play back voice mail messages), video communications (such as video conferencing, with or without concurrent audio communications), textual and pictorial communications (such as SMS messaging, MMS messaging, Instant Messaging such as via America On Line Instant Messaging Service), and so on.

Moreover, the communications device 125 may further allow for the creation of media files 105 based on the communication features of the communications device 125. For example, audio media files 105 may be created from phone conversations and voice mail. Video media files 105 may be created from video conferences participated in by the smart device 135. Textual media files 105 may be created from SMS messages, instant messages, or e-mail messages sent to or received by the communications device 125. Picture media files 105 may be created from MMS messages sent to or received from the communications device 125.

The communications device 125 may associate the media files 105 with geographic indications 115 and time indications 115 included in or determined from call records for a communications device 125. Call records may include information including geographic indications 115 such as where the communications device 125 was located when a particular call or message was sent, received, or concluded. The call records may further include time indications 115 of when the particular call or message was sent, received, concluded, or a time range during which the communication took place. For example, the communications device 125 may receive a media file 105 associated with a time indication 115 (e.g., from media creation device 120), and may further associate the media file 105 with a geographic indication 115 by using geographic information in call records for the time indicated by the time indication 115. In some examples, multiple geographic indications 115 may be determined from call records for a single communication if the communications device 125 was roaming during the communication, while in other examples only one geographic indication 115 may be determined, if any.

In some examples, a media creation device 120 may be connected to a communications device 125. For example, a media creation device 120 may be connected to a communications device 125 through a wired connection (such as through a Universal Serial Bus (USB) connection, an IEEE 1394 interface connection, over Ethernet, etc.) or a wireless connection (such as Bluetooth®, IEEE 802.11, WiMax, Wireless USB, etc.). In these examples, the media creation device 120 may communicate with the communications device 125, for example to upload media files 105 created by the media creation device 120 onto the communications device 125. Additionally, the communications device 125 may communicate with the communications network 130. This may allow, for example, a media files 105 created from a media creation device 120 optionally to be uploaded to the communications network 130, even though the media creation device 120 itself may lack network connectivity.

In further examples, both media creation device 120 and communications device 125 may be combined into one smart device 135. The smart device 135 may include the combined features of both the media creation device 120 and the communications device 125. For instance, a smart device 135 may include both the ability to create media files 105, and also the ability to connect to the communications network 130. In some examples, a smart device 135 may include media creation devices 120 such as a camera, a video recorder, and a text recorder for use in the creation of media files 105, and may further include the ability to communicate those media files 105 to the communications network 130.

A communications device 125 may store media files 105, as well as other information required for a media journal, locally on the communications device 125. For example, a subscriber may prefer to store and maintain the media files 105 locally on his own communications device 125, such as a personal computer, if for example the subscriber may have privacy concerns regarding the media files 105, intermittent network connectivity, or special needs regarding the media files 105. In examples where media files 105 may be stored locally, the communications device 125 may not be required to be in communication with a communications network 130 in order to store and retrieve the locally stored media files 105.

Additionally or alternately, a data center 140 may be connected to the communications network 130 and may be used to store and retrieve files of various types and for various uses, including but by no means limited to media files 105 and other information that may be included or required for the display of a media journal. A data center 140 typically includes a plurality of databases, the databases comprising a data store 145. In many examples, the data store 145 may include media files 105 of various file types (e.g., audio, video, textual, call records, etc.). While data store 145 is shown illustrated with a data center 140 that is geographically remote from a user location, data store may be associated with other devices, including, for example, smart device 135, communication device 125, or content provider 150. Moreover, there may be a plurality of data stores 145 within system 100, including redundant or at least partially redundant data stores. In some examples there may be a plurality of data stores 145 within system 100 including smart devices 135 and communication devices 125 operating as peer nodes and functioning as a peer-to-peer network.

In some examples, a content provider 150 may provide additional content or contextual information for use in media journals. For example, the content provider 150 may provide media files 105 including, but not limited to current and historical geographic maps, news stories for current and past events, current and historical weather information, historical trends, dates and descriptions of famous events, inventions, discoveries, wars, holidays, birthdays, and so on.

A content provider 150 may be connected to the communications network 130 directly or optionally through a gateway or other intermediary system. In some examples, the content provider 150 may be connected to the data center 140 directly, bypassing communications network 130. In any event, the content provider 150 may include or be connected to a database such as store 155, or in some examples may be connected to another network in order to store, maintain or retrieve the additional content. In other examples the additional content may be stored in the data center 140 or stored locally on the communications device 125 instead of or in addition to being stored by content provider 150.

In many examples, devices such as media creation device 120, communications device 125, smart device 135, data center 140, and content provider 150 comprise a computing device, including a processor, and storage. A processor (e.g., a microprocessor) receives instructions from storage, e.g., from a computer-readable medium such as a memory, and executes these instructions, thereby performing one or more processes, including one or more of the processes described herein. Such instructions may be stored and transmitted using a variety of known computer-readable media.

In general, computing devices may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, a computing device may be implemented as computer-readable instructions (e.g., software) on one or more computing devices (e.g., servers, personal computers, etc.), stored on computer readable media associated therewith (e.g., disks, memories, etc.).

A database may be included within a computing device such as communications device 125, smart device 135, data center 140, and content provider 150, or may be part of a separate computing system. A database device may include database tables allowing for the storage of data (including, but not limited to media files 105, additional content or contextual information, and other information for use in media journals, etc.) for use with system 100.

A database device may include one or more relational databases. Alternatively or additionally, a database device may include one or more object-oriented or hierarchical databases, or other mechanisms for storing and accessing data, including arrays, pointers, flat files, etc. As mentioned above, a database device may be included in a separate computing device from a computing device, or may be a software application executing on a same computing device as a computing device.

Data entries may be stored in a database device, whereby data entries may be updated, deleted, added, accessed, etc. Individual data entries may be represented by one or more database records included in database device.

The system 100 may further include a media journaling application 160, for example, loaded into the memory of a communications device 125 or a smart device 135. The media journaling application 160 may comprise instructions in a computer-readable medium that may be executed on a processor included in the communications device 125 or smart device 135. Through the execution of the instructions, various features and abilities of the media journaling application 160 may be implemented and available for use.

In some examples, the media journaling application 160 may implemented as a web browser navigated to a particular web page including for example, HyperText Markup Language (HTML), Java Script, Perl, etc. In other examples the media journaling application 160 may be implemented including proprietary client software. In some examples, the media journaling application 160 may be implemented as a stand-alone application, while in other examples, the media journaling application 160 may be implemented as a client-server application, for example with a client component executed by communication device 125 and a server component executed by another device on communications network 130 such as data center 140. A media journaling application 160 may be configured according to a subscriber's settings, and may allow for various functions.

As discussed above, a subscriber may create a plurality of media files 105, such as through use of a media creation device 120. The subscriber may connect a media creation device 120 to a communications device 125, and may instruct the media journaling application 160 to upload any media files 105 from the media creation device 120 to the communications device 125. As another example, the subscriber may configure the media journaling application 160 to automatically upload the media files 105 automatically from a media creation device 120, such as on a schedule, periodically (e.g., every hour), upon connection to the communications device 125, or automatically following creation. Media journaling application 160 may further be configured to automatically upload media files 105 to data center 140, for example, on a schedule, periodically, on command, when media journaling application 160 detects that the communications device 125 is connected to or within range of communications network 130, etc.

Additionally, media files 105 may be created automatically according to the configuration of the media journaling application 160, for example based on the communication features of the communications device 125. The media journaling application 160 may include settings to determine whether to create media files 105 based on the communication features of the communications device 125, and under what circumstances. For example, a media journaling application 160 may be configured to cause the communications device 125 to create a media file 105 based on each SMS and MMS message sent or received, but not to create media files 105 based on phone conversations or voice mail messages. In additional examples, media journaling application 160 may be configured to periodically capture media files 105 including the geographic location of the communications device 125.

A media journaling application 160 running on a smart device 135 may further be configured to create media files 105 automatically according to the media creation device included in the smart device 135, such as for example capturing an image media file 105 periodically, such as every 10 minutes.

The media journaling application 160 may further allow for the annotation of media files 105. For example the media journaling application 160 may allow a subscriber to add descriptive text to a media file 105. This descriptive text may further be associated with the media files 105 and stored in data center 140.

In addition, the media journaling application 160 may display a media journal, where the media journal may include at least one media file 105. Moreover, the media journaling application 160 may display the media journal as various types of view. For instance, the media journaling application 160 may display the media files 105 as a timeline, as a map, and as a web log. FIGS. 2, 3A, 3B, and 4 each illustrate a different exemplary view of various media files 105, and each figure is discussed in detail below.

A media journaling application 160 may be purchased for a fee from an offline store, such as a local electronics store, and uploaded or otherwise caused to be included in the memory of the smart device 135. In other examples, the media journaling application 160 may be obtained from an online store, from a communications provider such as the owner or operator of communications network 130, or from a service reseller of communications network 130.

In further examples a subscriber may subscribe to the use of a media journaling application 160, for example from a communications provider or service reseller. In these and other examples, the subscriber may be charged fees including, but not limited to, monthly service fees, per use fees, access fees, etc., for the use of the media journaling application 160. For example, use of media journaling application 160 could be marketed and sold to advanced users.

In any event, a media journaling application 160 may require to be turned on before the media journaling application 160 may perform any actions. Once the media journaling application 160 is purchased, and turned on, engaged, or otherwise activated through a triggering event, media journaling operations may be performed.

For example, a subscriber may purchase a media journaling application 160, and may go on vacation. During the vacation the subscriber may create a plurality of media files 105, for example through taking a plurality of pictures with a digital camera media creation device 120. As previously noted, a media creation device 120 may include a GPS device which may be used to determine geographic indications 115 and time indications 115 of a location and a time at which a media file 105 was created. These media files 105 may be uploaded to a communications device 125 or smart device 135. The communications device 125 or smart device 135 may then store the created media files 105 for the subscriber in a data center 140, where each media file 105 is associated with at least one indication 115, such as the geographic indication 115 and the time indication 115.

Moreover, while the subscriber is on vacation, the media journaling application 160 may be configured to log the phone numbers, names of subscribers to which the communications device 125 or smart device 135 was in communication, and even the communications messages themselves (e.g., telephone calls, SMS messages, MMS message, instant messages, etc.) for use as media files 105. These communications may be stored in the data center 140 according to the configuration of the media journaling application 160. The subscriber may configure the media journaling application 160 to automatically add indications 115 to the media files 105 indicating that they are to be included in the subscriber's media journal when they are uploaded to the data center 140. Additionally, the subscriber may manually add indications 115 to the media files 105 indicating which media files 105 are to be included or not to be included in the media journal. A subscriber may also manually add to a media journal, such as through typing in a textual media file 105.

The subscriber may further use the media journaling application 160 to add indications 115 to the media files 105 indicating that the media files 105 are to be shared with a social group including, for example, his family.

Figure 2:
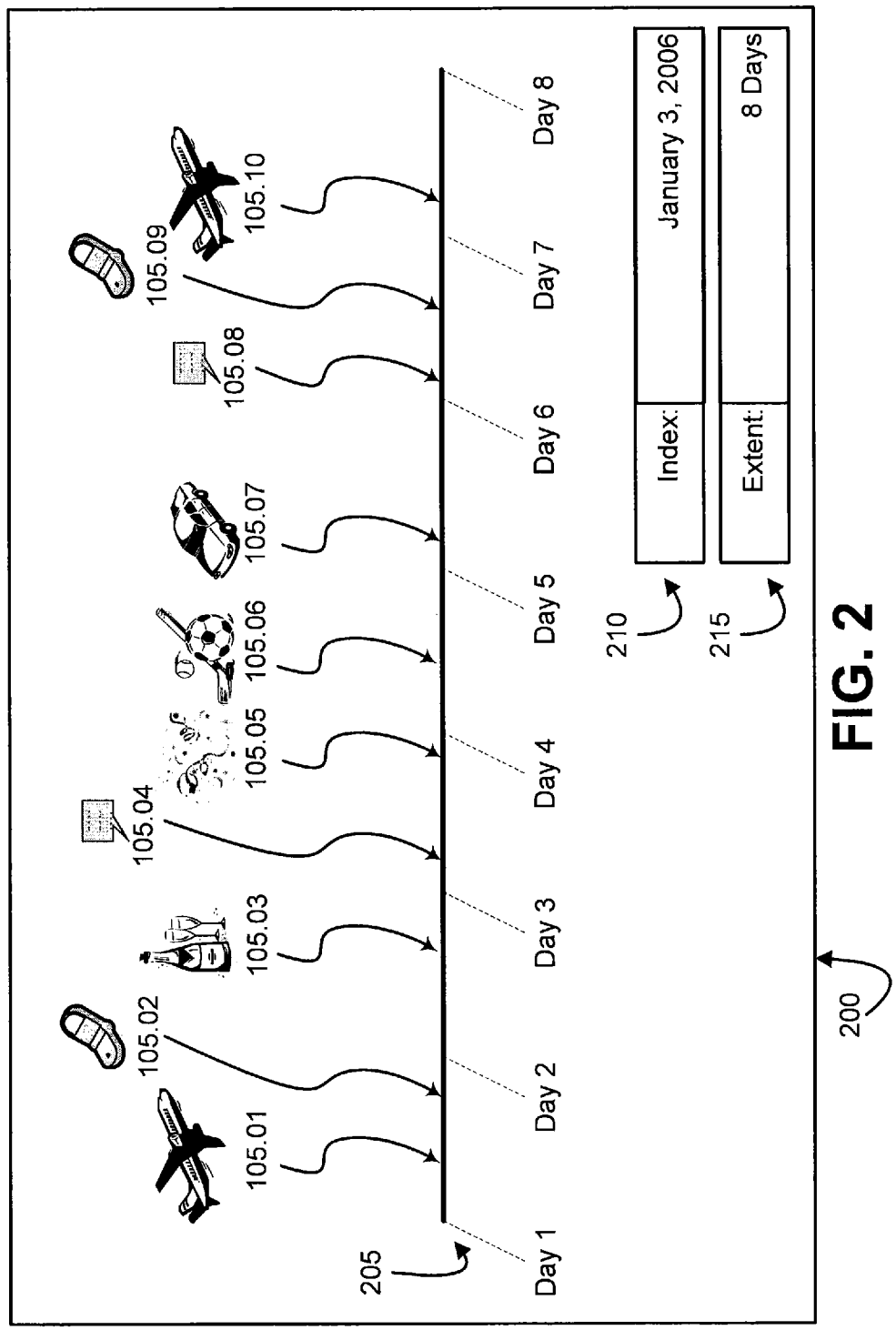
FIG. 2 illustrates an exemplary media journal in the form of a timeline view, including media files for a time indication.

FIG. 2 illustrates an exemplary media journal in the form of a timeline view 200, including media files 105 for a time indication 115. An exemplary timeline view 200 such as the one illustrated in FIG. 2 may be made available through a media journaling application 160, for example, operating on a smart device 135.

In the illustrative example a timeline in the form of a chronology 205 is shown, and may include a representation or exhibit of key events within a particular time period. In the example a timeline view 200 comprises illustrative material, such as media files 105, where the media files 105 are arranged chronologically. Although chronology 205 of timeline view 200 is illustrated as moving in time from left to right or top to bottom, other orientations or designs are possible.

A media journal may be displayed as a timeline view 200 according to a specified time indication 115. For example, a time indication 115 may be indicated as a time index 210 and a time extent 215. The time index 210 may be specified, for example as a date, or as a date and time, and may be used to define the beginning, ending, or center of a time indication 115 for which to display media files 105 within the media journal. The time extent 215 may define a width or a scope of the time indication 115 in relation to the time index 210, such as a number of days or hours before, after, or surrounding the time index 210. The media journaling application 160 may query a data center 140 for media files 105 to include in the chronology 205 according to the time indication 115.

As illustrated, chronology 205 includes a sequence of media files 105.01 through 105.10 arranged in chronological order and displayed along a line. The media files 105.01 through 105.10 are included according to the specified time index 210 and time extent 215. The chronology 205 may be marked off in units of days as illustrated, while in other examples a different unit or units of time may be used, or irregular intervals may be used. In some example the time indications 115 of the individual events or media files 105 may be labeled on the timeline. In other examples, markings of time may be unlabeled or entirely omitted.

The sequence of media files 105 in FIG. 2 may indicate a vacation. For example, media file 105.01 may be a picture taken at the time of arrival at the vacation destination. Media file 105.02 may be a recording of a phone conversation taken during the first day of the vacation. Media file 105.03 may be a picture taken during dinner on the second day of the vacation. Media file 105.04 may be an SMS message sent during the second day of the vacation. Media file 105.05 may be a picture of a party attended on the third day of the vacation. Media file 105.06 may be a picture of a game attended on the fourth day of the vacation. Media file 105.07 may be a picture taken on the fifth day of the vacation. Media file 105.08 may be an MMS message received during the sixth day of the vacation. Media file 105.09 may be a call record of a phone call received during the sixth day of the vacation. Media file 105.10 may be a picture taken at the time of departure from the vacation destination.

The timeline view 200 may allow for the display of media files 105, either as direct rendering of the media files 105, or as icons identifying the presence of a media file 105 at a particular time indication 115 on the chronology 205. For example, a text message media file 105.04 may be identified on the chronology 205 as an icon located at the time indication 115 when the text message was sent or received. As another example, an image media files 105.03 may be identified on the chronology 205 at the proper time indication 115 as scaled versions of the image media file 105.03 itself.

The timeline view 200 of the media journal may allow for operations to be performed on the displayed media files 105. For instance, the media files 105 may be selected, accessed, viewed, inserted, edited, annotated, deleted, and so on from the timeline view 200. As an example, a recorded phone conversation may be accessed and played back through an icon displayed on the map according to a location where the phone conversation is indicated on the interactive map to have taken place.

Although a timeline view 200 form of a media journal may display media files 105 arranged chronologically, such as according to time indications 115 associated with the media files 105, a timeline view 200 of a media journal may further display media files 105 according to a specified geographic indication 115, such as according to geographical indication 115 specified by a subscriber. For example, media files 105 may only be displayed for a particular geographic index and geographic extent. Thus, media files 105 outside of that geographic indication 115 may be omitted from the chronology 205, although some examples of a timeline view 200 may not display geographic information.

Figure 3A:
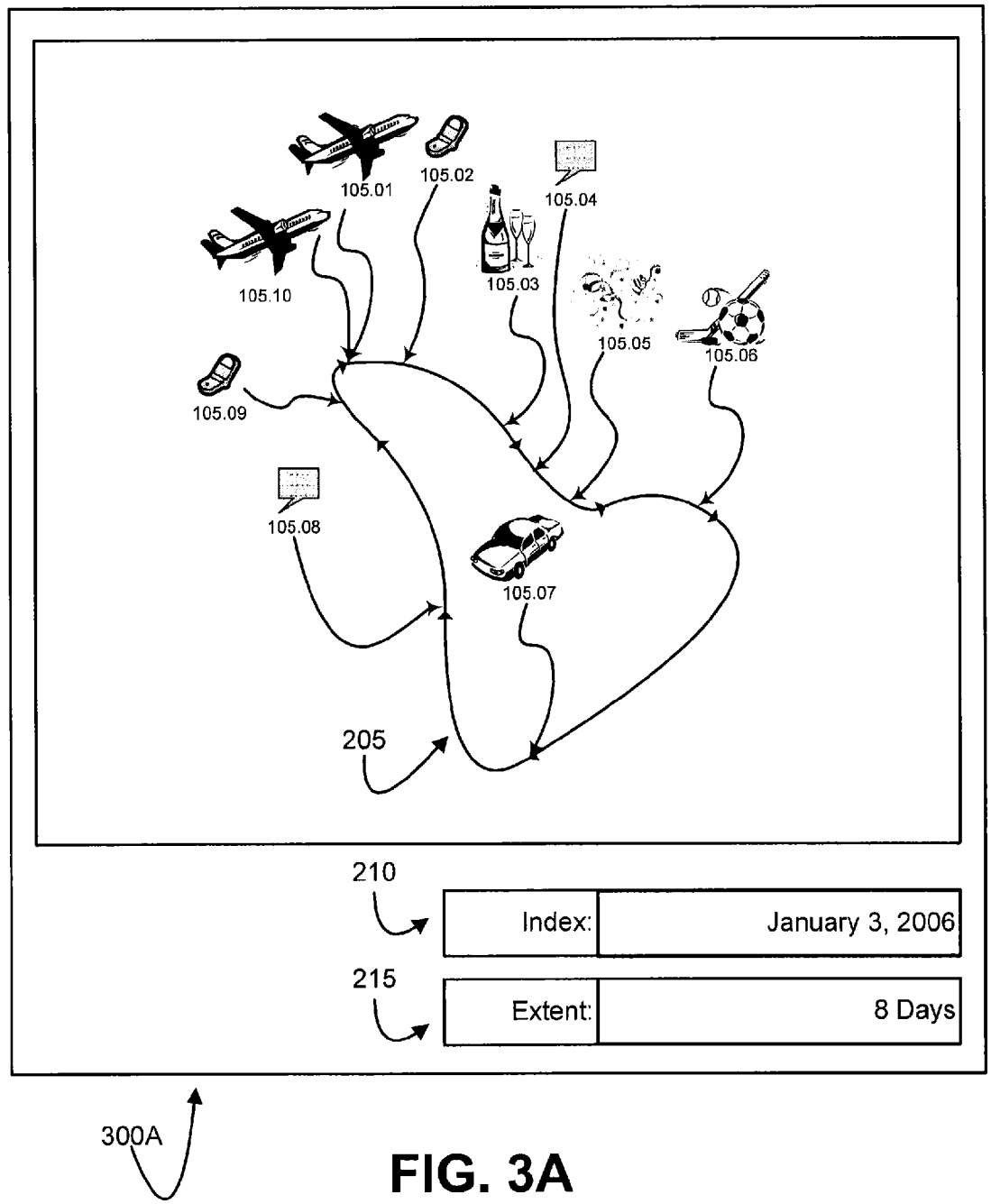
FIG. 3A illustrates an exemplary media journal in the form of a media journal map for a particular geographic indication and time indication.

FIG. 3A illustrates an exemplary media journal in the form of a media journal map 300 for a particular geographic indication 115 and time indication 115. An exemplary media journal map 300 such as the one illustrated in FIG. 3A may be made available through a media journaling application 160, for example executed on a smart device 135. As illustrated, the interactive map in FIG. 3A includes the same media files 105.01 through 105.10 as displayed in FIG. 2. Indeed, FIGS. 2 and 3A illustrate different views of the same stored information, and the same information is used in both figures to illustrate different potential views or presentations of media journals.

A media journal map 300A may include a map of a specified region. An underlying map for the media journal map 300A may be a known web service mapping platform including, but not limited to "Google street view," Map Quest, or Yahoo! Maps. In some examples maps are retrieved from the data center 140, while in other examples maps are retrieved from content provider 150.

As the subscriber may indicate a time indication 115 in a query for media files 105 to display in the media journal view (e.g., through use of time index 210 and time extent 215), the subscriber may further indicate a geographic indication 115 in a query for media files 105 to display in the media journal map 300A. The media journaling application 160 may query the data center 140 for media files 105 to include in the media journal map 300 according to the geographic indication 115 and the time indication 115. In some examples, the query further includes a subscriber indication 115, such as an indication 115 of the subscriber whose media journal is being accessed, or an indication 115 of the subscriber whose communications device 125 is being used.

In an approach similar to that discussed above with regard to the timeline view 200 of a media journal, the media journal map 300A may also allow for the display of media files 105 on the media journal map 300A, either as direct rendering of the media files 105, or as indications 115 of the presence of a media file 105 at a particular geographic indication 115 on the media journal map 300A. The media journaling application 160 may retrieve a map from the data center 140 or content provider 150 according to a query, and may place the media files on the map according to a location, wherein each media file is displayed at a location on the map according to a geographic indication 115 associated with the media file. For example, an SMS message media file 105.04 may be indicated in the media journal map 300A as an icon located at the geographic indication 115 associated with where the text message was sent or received. As another example, image media files 105.03 may be indicated on the media journal map 300A as a scaled version of the image media file 105.03.

Also similar to the approach discussed above with regard to the timeline view 200 of a media journal, the media journal map 300A may also allow for operations to be performed on the displayed media files 105. For example, the media files 105 may be selected, accessed, viewed, inserted, edited, annotated, deleted, and so on from the media journal map 300A.

In some examples, a timeline view in the form of a chronology 205 may be indicated on the media journal map 300A, such as being indicated as a directed graph, to provide additional information regarding the media files 145 being displayed. An exemplary chronology 205 is indicated in FIG. 3A, but incorporating aspects of geography.

Although the map shown in FIG. 3A is displayed at a particular geographic indication 115, different levels of zoom and maps of different geographic indices are possible. Moreover, although the map shown in FIG. 3A shows media files 105 for a specific time indication 115, a media journal map 300A may display information for a different time indication 115, for example for a different time index 210 and/or time extent 215.

In some examples of a media journal map 300A, media files 105 may be displayed without regard to time indication 115. For example, an interactive map could for example be a map of the entire world, onto which a path may be displayed indicating the location of all of a subscriber's media files 105, regardless of time.

In some examples, media files 105 may be associated with a label indication 115, and the data center 140 may be queried according to the label indication 115 to retrieve the media files 105 associated with or filtered by the label indication 115. For example picture media files 105 taken on a vacation may be indicated by a label indication 115 as an album of pictures for the vacation. The media journaling application 160 may then query the data center 140 for media files 105 to include in the media journal map 300 according to at least one of the subscriber indication 115, geographic indication 115, time indication 115, and label indication 115. The media journaling application 160 may query based on other indications 115 as well, and may for example query the data center 140 according to media file type indication 115 to include only picture media files 105 in the media journal map 300.

In further examples, multiple indications 115 may be associated together as a filter, and the media journaling application 160 may query the data center 140 for media files 105 to include in the media journal map 300 according to the filter. For example, a subscriber may create a filter for a vacation to Hawaii in 2005 using appropriate indications 115, and may include a link to the filter on the subscriber's web page. A visitor to the web page may access the link and view a media journal according to the filter. As another example, a travel company may promote its services by including a link on a web site to a media journal filtered to include media files 105 for a sample vacation. A potential customer of the travel company may follow the link to view a media journal including the sample vacation.

Figure 3B:
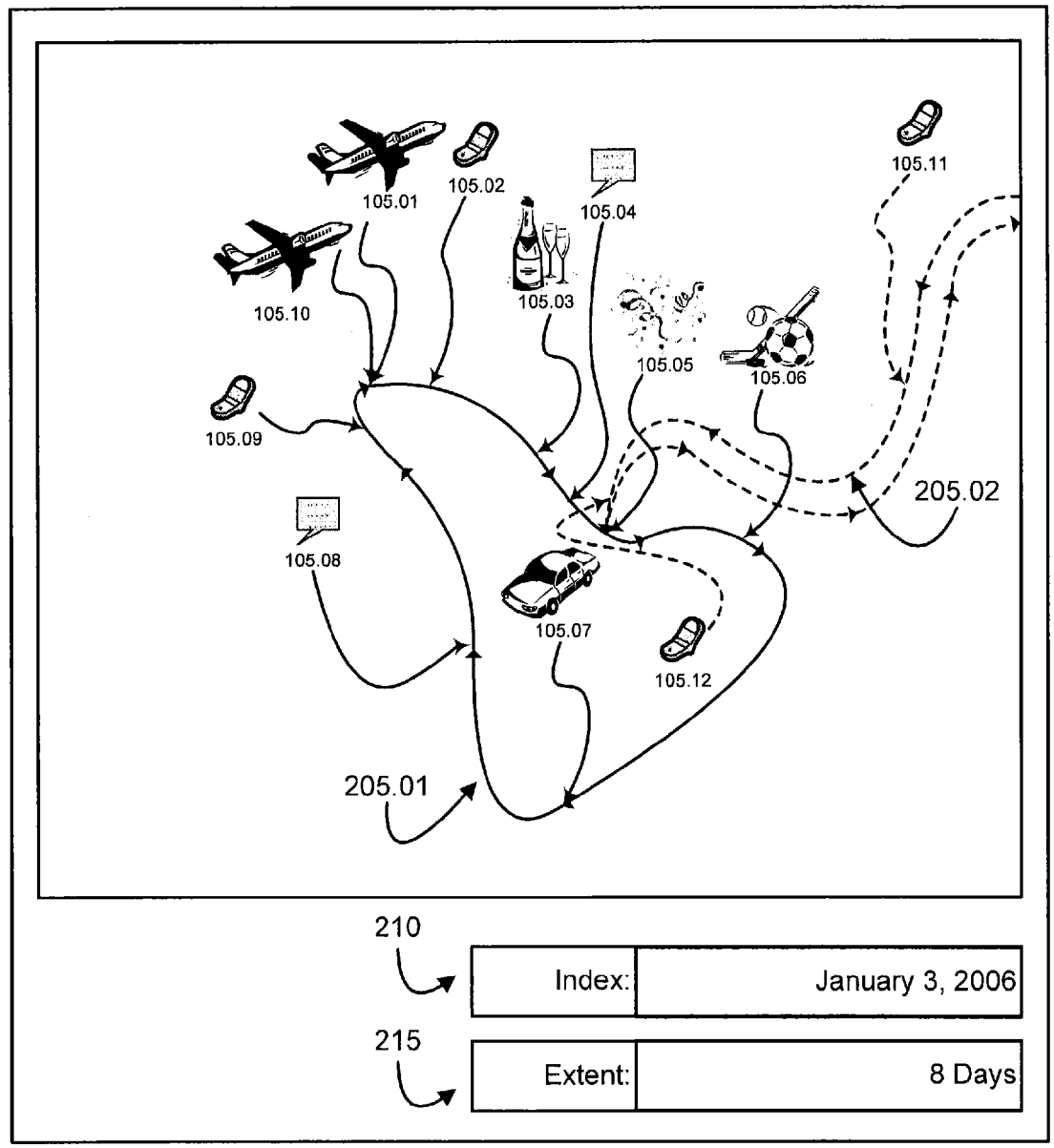
FIG. 3B illustrates an exemplary media journal in the form of a media journal map for a particular geographic indication and time indication, including timelines associated with two subscribers, each of whom attended the same event.

FIG. 3B illustrates an exemplary media journal in the form of a media journal map 300B for a particular geographic indication 115 and time indication 115, including a timeline view incorporating a chronology 205 associated with two subscribers, each of whom attended the same event. As illustrated, the media journal map 300B includes a first exemplary subscriber as solid chronology 205.01. The media journal map 300B further includes a second subscriber indicated as chronology 205.02. Although media journal map 300B shows media files 105 for two subscribers, media journal maps 300B displaying media files 105 for more or fewer subscribers are possible.

A media journaling application 160 may allow for a subscriber to determine if any other subscribers were at the same geographic indication 115 and time indication 115 as the subscriber. For example, a subscriber may select a media file, and the media journaling application 160 may identify a geographic indication 115 and a time indication 115 for the selected media file 105. The media journaling application 160 may query the data center 140 according to the identified indications 115, and receive a result including media files 105 corresponding to the identified indications 115.

Regarding chronology 205.01, as discussed above, a subscriber may create a media file 105.03 while at dinner on vacation. The subscriber may then select media file 105.03 and may use the media journaling application 160 to determine if any other subscribers were at the same dinner at the same time. The media journaling application 160 may identify a geographic indication 115 and a time indication 115 for the subscriber relating to the dinner, such as through use of the indications 115 associated with media file 105.03. The media journaling application 160 may then query the data center 140 according the identified indications 115. If any media files 105 are returned for other subscribers the media journaling application 160 may further display the additional timelines such as chronology 205.02 on the media journal map 300B along with chronology 205.01.

Similarly, the media journaling application 160 may further query a content provider 150 for historical information such as weather readings according to the time indication 115 and geographic indication 115 associated with a particular media file 105. The historical information (e.g., weather conditions) may further be displayed in the media journal.

Alternately, the media journaling application 160 may query the stored media files 105 to determine where a subscriber was at the time of a historical event. For example, a time indication 115 and geographic indication 115 of a historical event may be received from a content provider 150. The media journaling application 160 may then query the subscriber's media files 105 based on a time indication 115 of the event, and may use the result of the query to determine what the subscriber was doing at the time of the event. For example, the media journaling application 160 may determine from a content provider 150 a time indication 115 for when a US president was shot, and may query the data center 140 for media files 105 at that time indication 115, such as specified as a time index 210 and time extent 215. The media journaling application 160 may then display the retrieved media files 105 in a media journal view.

Figure 3C:
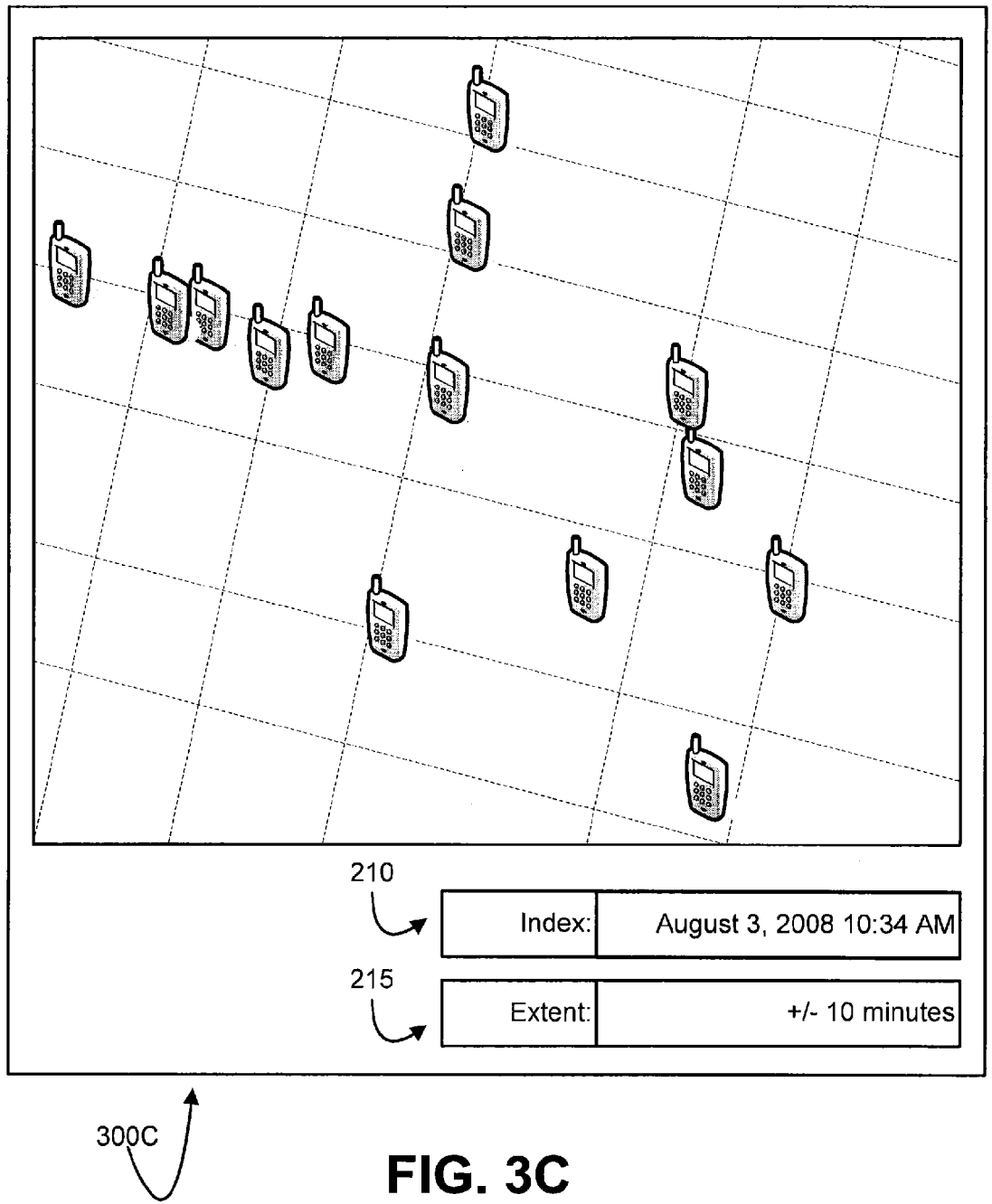
FIG. 3C illustrates an exemplary media journal in the form of a media journal map for a particular geographic indication and time indication for a plurality of subscribers.

FIG. 3C illustrates an exemplary media journal in the form of a media journal map 300C, for a particular geographic indication 115 and time indication 115 for a plurality of subscribers.

The media journaling application 160 may display a media journal map 300C including all subscribers at a geographic indication 115 and time indication 115, but not by subscriber indication 115. In the example, the time indication 115 is indicated by time index 210 of "Aug. 3, 2008 10:34 AM" and time extent 215 of "±10 minutes."

Media journal map 300C may, for example, allow law enforcement to view a media journal including the locations of many subscribers within a limited time indication 115 to identify subscribers within a time indication 115 and geographic indication 115. The identified subscriber may then be contacted to aid in the possible identification of a subscriber who may have been a victim, witness, or perpetrator of a crime. In some examples, the identified subscribers may be contacted through use of the subscriber's communications devices 125. Moreover, when in use by law enforcement, the media journaling application 160 may override permissions with regard to shared media files 105 stored in data center 140, and may thus show all media files 105, including location data, without regard to what media files 105 were shared.

Figure 4:
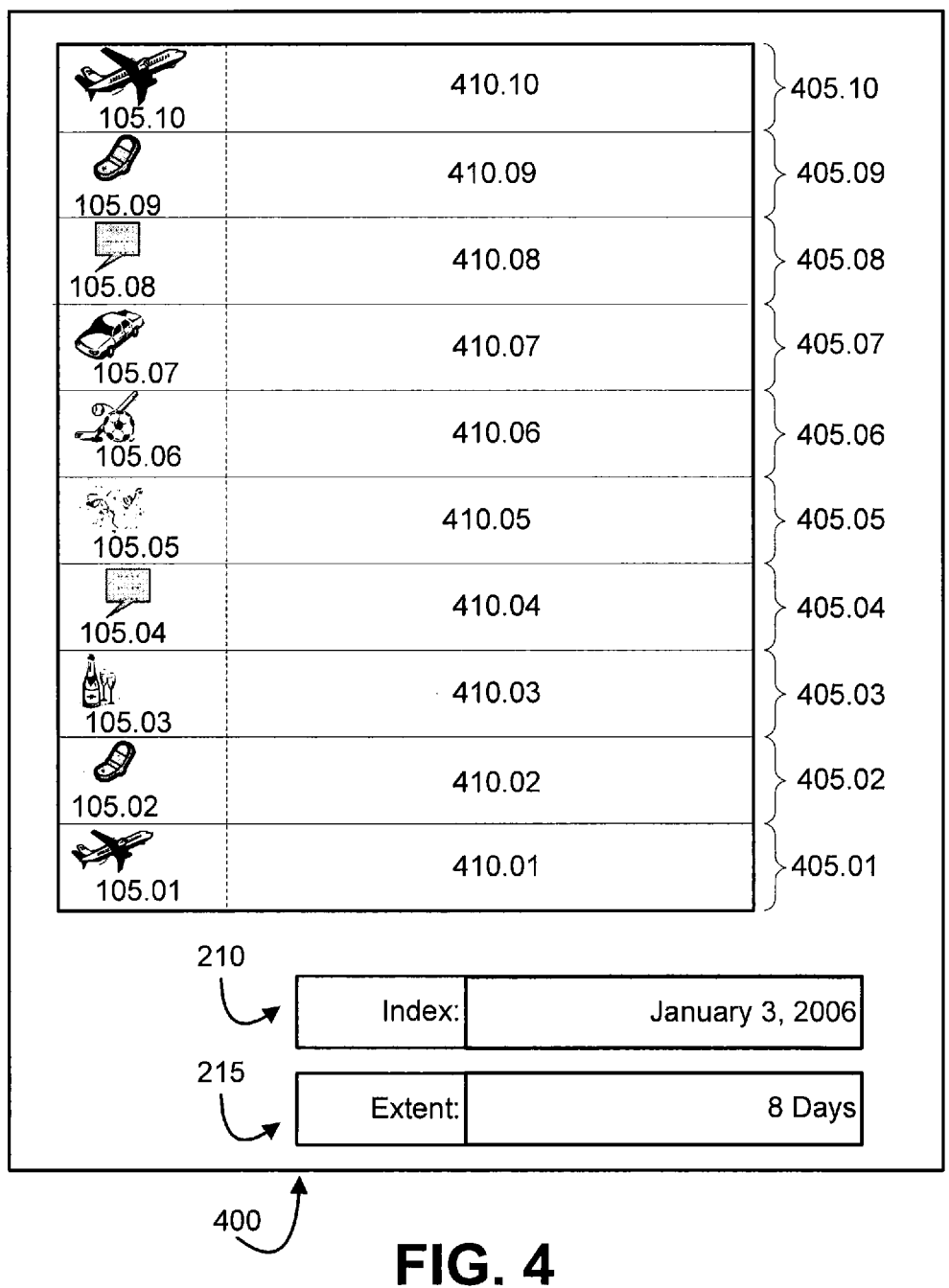
FIG. 4 illustrates an exemplary media journal in the form of a media journal blog.

FIG. 4 illustrates an exemplary media journal in the form of a media journal blog 400. As illustrated, the media journal blog 400 in FIG. 4 includes the same media files 105.01 through 105.10 as displayed in FIGS. 2 and 3A. Indeed, FIGS. 2, 3A, and 4 illustrate different views of the same stored information, and the same information is used in both figures to illustrate different potential views or presentations of media journals. An exemplary media journal blog 400 such as the one illustrated in FIG. 4 may be made available through a media journaling application 160.

Similar to as discussed above, a time indication 115 may be specified by a time index 210 and a time extent 215. Moreover, similar to as discussed above, a geographic indication 115 and a subscriber indication 115 may be specified. The media journaling application 160 may then query the data center 140 for media files 105 to include in the media journal blog 400 according to at least one of the geographic indication 115, time indication 115, and subscriber indication 115.

The media journal blog 400 may include at least one blog entry 405. Additionally, each blog entry 405 may include a media file 105 and an entry description 410. As illustrated, the blog entries 405 are listed in the media journal blog 400 in reverse chronological order, with the most recent entry at the top, although other orientations, designs, and orderings are possible.

An entry description 410 may be generated by a media journaling application 160 automatically from a stored media file 105. For example, in the case of an SMS message media file 105 (e.g., media file 105.04, media file 105.08, etc.), the entry description 410 may include the text of the text message sent. In other examples, such as for an image media file 105 (e.g., media file 105.03, media file 105.05, etc.) a subscriber may use media journaling application 160 to input an annotation which may be used as an entry description 410.

Figure 5:
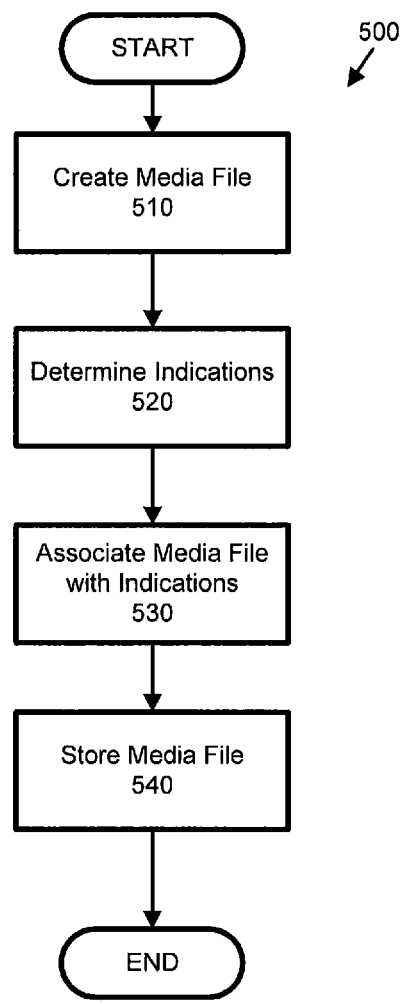
FIG. 5 illustrates an exemplary process flow for the creation and storage of media files.

FIG. 5 illustrates an exemplary process flow 500 for the creation and storage of media files 105. Through execution of process flow 500, media files 105 may be stored in a data center 140 on a communications network 130. The media files 105 may then be used by subscribers in media journal view including timelines views 200, media journal maps 300A, 300B, 300C, and media journal blogs 400.

In step 510, a media file 105 may be created. For example, a subscriber may use a media creation device 120 to create a media file 105 (e.g., image media file, text media file, video media file, etc.). As another example, a media file 105 may be created based on the communication features of the smart device 135 (such as from a voice communication, an SMS message, an MMS message, an IM message, etc.). In still other examples, the media file 105 may be created automatically by a media journaling application 160 executed by the smart device 135 (e.g., taking a picture based on a timer or event, logging subscriber use of the smart device 135, etc.)

Next, in step 520, indications 115 to associate with the media file 105 may be determined. In some examples both a location indication 115 and a geographic indication 115 may be determined. For example, a media creation device 120 may include or be connected to a GPS device. The GPS device may then be used to determine a geographic indication 115 of the media creation device 120 at or near the time the media file 105 is created. In other examples, the geographic indication 115 may be determined based on a network device to which the media creation device 120 is or was connected, or may be received from a subscriber or otherwise determined based on a subscriber-entered value.

Next, in step 530, the media file 105 may be associated with the indications 115. For example, the media creation device 120 may embed the indications 115 into a metadata 110 portion of the media file 105.

Next, in step 540 the media file 105 may be stored. For example, the media file 105 may be uploaded to a data center 140 connected to a communications network 130, and indexed according to the indications 115. In other examples, the media file 105 may be stored locally on the communications device 125. Then, the process 500 ends.

Figure 6:
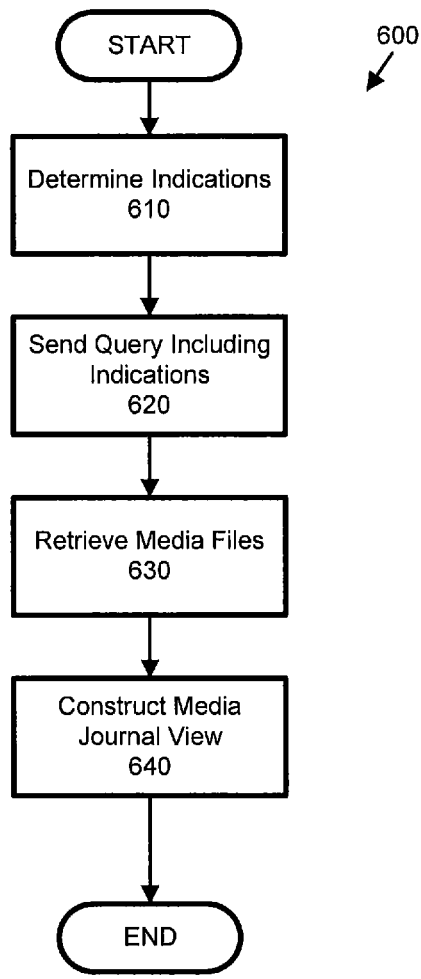
FIG. 6 illustrates an exemplary process flow for the display of a media journal.

FIG. 6 illustrates an exemplary process flow 600 for the display of a media journal.

In step 610, indications 115 may be determined. For example, a subscriber may input a time indication 115 in the form of a time index 210 and a time extent 215. As another example a subscriber may further indicate a geographic indication 115. In some examples a subscriber indication 115 may be determined, such as an indication 115 of the subscriber whose media journal is being accessed, or an indication 115 of the subscriber whose communications device 125 is being used. Alternately, a subscriber may select a media file 105, and the media journaling application may identify indications 115 associated with the selected media file 105.

Next, in step 620, a query may be sent. For example, media files 105 may be maintained by a data center 140 connected to a communications network 130 or by a local data store 145. A communications device 125 or smart device 135 may query data center 140 or data store 145 for media files 105 to include in a media journal. The query may include at least one indication 115, such as a geographic indication 115 and a time indication 115.

Next, in step 630, media files 105 may be received. For example, at least one media file 105 may be received by the communications device 125 from the data center 140 through use of the communications network 130. As another example, at least one media file 105 may be retrieved from a local data store 145. The media files 105 may be include media files that are associated with the at least one indications 115 as specified by the query.

Next, in step 640, a media journal display may be constructed. For example, a media journaling application 160 may construct a media journal view based on the media files 105. As discussed above, the media journal view may be displayed as a blog such as media journal blog 400, as a map such as media journal maps 300A, 300B and 300C, as a timeline view 200, or in some other format. Then, the process 600 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    identifying, by a communications device, at least one of a geographic indication and a time indication;
    sending a query from the communications device to a data store, the data store maintaining a plurality of media files, the plurality of media files including media files created by media creation devices and media files created based on network communications features of communications devices, each media file associated with at least one indication, the query including the identified at least one indication;
    receiving a plurality of media files from the data store according to the query, the plurality of received media files including a first chronology including a first sequence of media files created by the communications device and a second chronology including a second sequence of media files created by a second communications device; and
    displaying the first chronology and the second chronology on a map, the first chronology including the first sequence of media files placed at locations on the map according to geographic indications associated with the respective media files of the first sequence and a first timeline connecting the first sequence of media files in chronological order according to time indications associated with the respective media files of the first sequence, the second chronology including the second sequence of media files placed at locations on the map according to geographic indications associated with the respective media files of the second sequence and a second timeline connecting the second sequence of media files in chronological order according to time indications associated with the respective media files of the second sequence.

2. The method of claim 1, further comprising displaying the retrieved plurality of media files within a media journal view to illustrate both the first chronology and the second chronology.

3. The method of claim 2, wherein identifying at least one indication comprises receiving at least one indication from a subscriber.

4. The method of claim 2, wherein identifying at least one indication comprises identifying an event received from at least one of a content provider and a data store, and determining at least one indication according to the received event.

5. The method of claim 2, further comprising:
    selecting a media file;
    wherein identifying at least one indication comprises identifying at least one indication associated with the selected media file.

6. The method of claim 5, wherein selecting a media file comprises selecting a media file from the media journal view.

7. The method of claim 5, further comprising displaying the selected media file in the media journal view along with the retrieved at least one media file.

8. The method of claim 2, further comprising displaying the media journal view as at least one of a map, a timeline, and a blog.

9. The method of claim 2, further comprising representing the media files in the media journal as at least one of an icon and a scaled image of the media file, and varying the representation according to a type of the media file.

10. The method of claim 1, further comprising:
    retrieving the map according to the query.

11. The method of claim 2, further comprising displaying the media journal view as a blog, the blog including a plurality of blog entries arranged in reverse chronological order, at least a subset of the blog entries including at least one of the received plurality of media files.

12. The method of claim 1, wherein each of the first timeline and the second timeline is displayed on the map in chronological order as a directed graph.

13. The method of claim 1, wherein the query comprises a geographic indication, a time indication, a subscriber indication and a label indication.

14. The method of claim 1, wherein the data store is associated with a location geographically remote from a user device.

15. The method of claim 1, wherein the media files created based on the network communications features of communications devices are based on at least one of a voice communication, an SMS message, an MMS message, and an IM message.

16. The method of claim 1, wherein at least one of the plurality of media files is created automatically by a media journaling application executed by the communications device and configured to log subscriber use of the network communications features of the communications device.

17. The method of claim 1, further comprising:
    selecting a media file from the first chronology; and
    identifying the at least one indication based on the selected media file.

18. A system, comprising:
    a communications network, configured to provide communication services to a plurality of devices;
    a data store, configured to:
        maintain a database including a plurality of media files indexed by indication, the plurality of media files including media files created by media creation devices and media files created based on network communications features of communications devices;
        receive a query for media files from a communications device associated with a subscriber and selectively connected to the communications network, where the query comprises at least one indication; and
        provide media files to the communications device in response to the query, the media files including a first sequence of media files created by the communications device and a second sequence of media files created by a second communications device; and where the communications device includes a memory storing instructions and a processor configured to execute the instructions to cause the communications device to:
  send a query to the data store, where the query includes at least one indication;
  retrieve a plurality of media files from the data store according to the query; and
  display a first chronology including the first sequence of media files created by the communications device, along with a second chronology including the second sequence of media files created by the second communications device, the first chronology and the second chronology being displayed on a map, the first chronology including the first sequence of media files placed at locations on the map according to geographic indications associated with the respective media files of the first sequence and a first timeline connecting the first sequence of media files in chronological order according to time indications associated with the respective media files of the first sequence, the second chronology including the second sequence of media files placed at locations on the map according to geographic indications associated with the respective media files of the second sequence and a second timeline connecting the second sequence of media files in chronological order according to time indications associated with the respective media files of the second sequence.

19. The system of claim 18, further comprising a media creation device, wherein the media creation device is configured to:
  create media files, and
  send media files to a communications device;
  wherein the communications device is further configured to receive media files from the media creation device; and send the media files to the data store; and
  wherein the data store is further configured to receive the media files sent from the communications device, and store the media files in the data store indexed according to at least one of a geographic indication, a time indication, a subscriber indication, and a label indication.

20. The system of claim 19, wherein the media creation device and communications device are both included as part of a smart device.

21. The system of claim 18, wherein the communications device is further configured to create media files based on the communication features of the communications device.

22. The system of claim 18, wherein the data store is further configured to maintain map information, and wherein the communications device is further configured to:
  retrieve the map according to the query.

23. The system of claim 18, wherein the communications device is further configured to represent the media files in the media journal as at least one of an icon and a scaled image of the media file, and vary the representation according to a type of the media file.

24. The system of claim 18, wherein the query comprises at least one of a geographic indication, a time indication, a subscriber indication and a label indication.

25. The system of claim 18, further comprising a content provider, where the content provider is configured to provide third-party content including at least one of additional content and contextual information for use in the media journal.

26. The system of claim 25, wherein the third-party content from the content provider is stored in the data store, and wherein the data store is further configured to provide content including at least a subset of weather, news, and timing of events in response to the query.

27. The system of claim 26, wherein at least one of weather, news and timing of events is historical.

28. A non-transitory computer readable medium comprising instructions configured to cause a processor to:
  display a media journal including at least one media file created by a first communications device;
  receive a selection of a media file created by the first communications device from the media journal;
  determine a time indication and a geographic indication based on the received selection of the media file;
  query a data store for additional media files according to the time indication and geographic indication, the data store including a plurality of media files including media files created by media creation devices and media files created based on network communications features of communications devices;
  retrieve at least one additional media file created by a second communications device; and
  display, in the media journal, a first chronology including a first sequence of media files created by the first communications device along with a second chronology including a second sequence of media files including at least one at least one additional media file created by the second communications device, the first chronology and the second chronology being displayed on a map, the first chronology including the first sequence of media files placed at locations on the map according to geographic indications associated with the respective media files of the first sequence and a first timeline connecting the first sequence of media files in chronological order according to time indications associated with the respective media files of the first sequence, the second chronology including the second sequence of media files placed at locations on the map according to geographic indications associated with the respective media files of the second sequence and a second timeline connecting the second sequence of media files in chronological order according to time indications associated with the respective media files of the second sequence.

* * * * *